March 10, 1970     L. W. SAHLEY     3,499,710
DOCUMENT FEEDER Filed Feb. 21, 1967     7 Sheets-Sheet 1

INVENTOR.
LLOYD W. SAHLEY
BY
ATTORNEYS

March 10, 1970

L. W. SAHLEY 3,499,710

DOCUMENT FEEDER

Filed Feb. 21, 1967

INVENTOR.
LLOYD W. SAHLEY
BY
*Yount, Raney, Flynn & Tarolli*
ATTORNEYS

March 10, 1970

L. W. SAHLEY 3,499,710

DOCUMENT FEEDER

Filed Feb. 21, 1967

INVENTOR.
LLOYD W. SAHLEY
BY
Yount, Raney, Flynn & Tarolli
ATTORNEYS

March 10, 1970 — L. W. SAHLEY — 3,499,710

DOCUMENT FEEDER

Filed Feb. 21, 1967 — 7 Sheets-Sheet 5

INVENTOR.
LLOYD W. SAHLEY
BY
Yount, Raney, Flynn & Tarolli
ATTORNEYS

FIG.14

United States Patent Office 3,499,710
Patented Mar. 10, 1970

3,499,710
DOCUMENT FEEDER
Lloyd W. Sahley, Shaker Heights, Ohio, assignor to Midwestern Securities Corporation, New York, N.Y., a corporation of New York
Filed Feb. 21, 1967, Ser. No. 617,582
Int. Cl. G03b 27/32
U.S. Cl. 355—64                                         43 Claims

ABSTRACT OF THE DISCLOSURE

A document feeder for use with known copying machines in which the document to be copied is positioned at a copying station for exposure to the copying mechanism of the machine. The feeder advances a document from a document supply station to the copying station, positions the document properly thereat, and actuates the copying machine to copy the document. After the document has been exposed to the copying machine, it is fed to a document supply station. The operation is repeated until all pages of the document have been copied. Certain of the feeder embodiments provide for automatically feeding a document a preselected number of times to the copying machine to make the preselected number of copies of the document. The feeder automatically compensates for advancing different size and thickness of sheets so the individual sheets of a document stack to be fed may include sheets of widely differing size and thickness. The pages of the document stack are fed in numerical order to the copying station and are stacked after exposure in the same numerical order. After the last page of the document is removed from the copying station, the feeder again advances the first page of the document to the copying station automatically if another copy of the document is to be made. The succeeding pages are then fed in numerical order to the copying station and the second copy of the document is made by the copying machine. The operation is continued until the selected number of copies of the document have been made and the feeder is shut off. The copies are delivered from the copying machine in numerical order since the document pages are always maintained in the order in which they are loaded into the feeder and consequently do not have to be collated.

It is an important object of the present invention to provide a new and improved document feeder for a copying machine and into which the operator loads the document and sets the controls to automatically present the document to the copying station of a copying machine a preselected number of times and actuate the machine to make a corresponding number of copies of the document and which feeder greatly reduces the time and labor required of an operator.

Another object of the present invention is the provision of a new and improved document feeder for a copying machine as noted in the preceding paragraph wherein one copy of the document is made by the copying machine each time the document is fed between document trays and when the last page of the document has been exposed to the copying mechanism and is delivered to one of the trays, the feeder is automatically reversed and the pages of the document are fed from the one tray to the copying station and to the other tray until the selected number of copies have been made.

Still another object of the present invention is the provision of a new and improved document feeder for a copying machine as noted in the preceding paragraph wherein the document is fed to the copying station from lower portions of the trays and is received from the station at upper portions of the trays and means are provided for controlling the feeder so that when feed is from one of the trays, the other tray is arranged to receive the document and vice versa.

Another object of the present invention is to provide a new and improved document feeder for feeding the pages of a document to a copying station of a copying machine in numerical order and are discharged therefrom and stacked in the same numerical order so that the pages of each copy made of the document are automatically collated as they are delivered from the copying machine.

A further object of the present invention is the provision of a document feeder for a copying machine and which automatically compensates for advancing to the copying machine a document comprising individual sheets of different size and thickness so that sheets of different physical characteristics may be fed without making any adjustment of the feeder.

Still another object of the present invention is the provision of a new and improved document feeder as set forth in the preceding paragraph wherein the copying machine has an exterior copying window on which the sheet or sheets of the document to be copied are advanced into a copying position by a plurality of driven rollers supported above the window and are counterbalanced to exert a preset light pressure on the window, and the rollers are readily movable away from the window by a sheet moving therebetween and extent necessary to accommodate the sheet thicknesses and yet exert sufficient pressure on the sheets to drive the sheets to the copying position.

Another object of the present invention is to provide a new and improved document feeder for automatically feeding a document to be copied from a document storage station to a copying window of a copying machine to eliminate manual feeding of the copying machine.

A further object of the present invention is the provision of a new and improved document feeder as noted in the preceding paragraph wherein the feeder has a frame supported on the machine so that at least a portion thereof overlies the copying window and the overlying portion can be readily moved away from the window to provide for freeing a jammed page or to manually position a book or the like on the window.

Another object of the present invention is the provision of a new and improved document feeder for automatically advancing a page or pages of a document to a copying window of a copying machine and wherein the document is loaded into a document supply station overlying the copying window with the bottom page exposed to the copying window and feeding means successively removes the bottom page after each bottom page has been copied by the copying machine and conveys same to a document receiving station.

Still another object of the present invention is the provision of a new and improved document feeder as noted in the preceding paragraph where the feeding means includes a reciprocable member having sheet gripping means and which is moved into gripping engagement with the bottom sheet and removes the sheet upon retraction of the member and directs it to a conveyor which delivers the sheet to the document receiving station.

A further object of the present invention is the provision of a new and improved document feeder having a carriage with sheet gripping means for successively gripping pages of the document at a document supply station and conveying the pages to and properly positioning them at the copying station and removing them from the copying station and depositing same at a document receiving station.

A still further object of the present invention is the provision of a new and improved document feeder as noted in the preceding paragraph wherein the sheets are gripped by suction members and are released by discontinuing operation of a suction pump.

These and other objects will become apparent from the following detailed description of illustrated embodiments of the invention taken in conjunction with the accompanying drawings and in which:

The present invention relates to a novel feeder for feeding a page or pages of a document to a copying station of a copying machine. The term document as used herein is intended to mean multiple related pages. The copying machine is operated to make an image of the document and make a copy thereof each time a page has been advanced to the copying station. In the illustrated feeder embodiments, the documents are fed to a copying machine which has an exterior window through which the document is exposed to the copying mechanism of the copying machine. It should be appreciated, however, the feeders according to the present invention have applicability for feeding sheets to copying machines which have copying stations other than a window or the like.

Several of the illustrated embodiments provide for automatic feeding of documents to a copying station a selected number of times so that the machine can make the required number of copies of the document without manual reloading. In certain other of the illustrated embodiments, the feeders require manual reloading after one copy of the document has been made by the copying machine. In all but one of the illustrated feeder embodiments, the pages of the document are stacked as they are delivered from the copying station in the same numerical order in which they are originally stacked when loaded into the feeder so that if the document is to be again fed to the copying station whether manually or by automatic means, the copied pages of the document are delivered from the copying machine in numerical order and no collating of pages is required.

Figure 8:
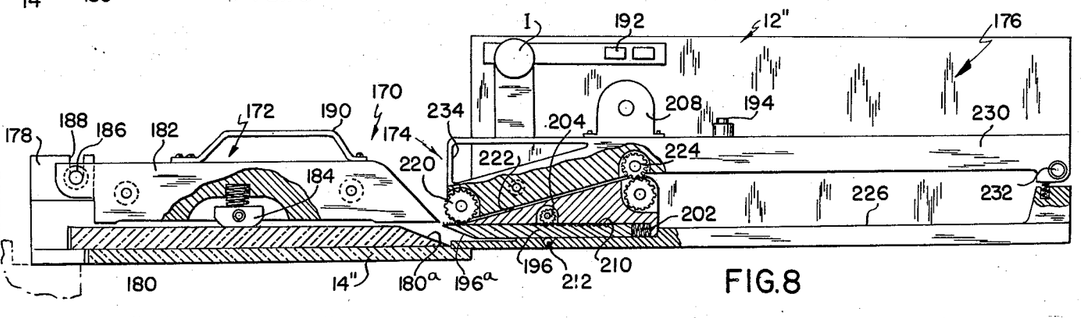
FIG. 8 is a frontal elevational view showing portions in section of another feeder embodiment of the present invention.

The feeders according to the illustrated embodiments of the present invention are adaptable for use with several commercially-available copying machines. The machine shown in FIGS. 1, 2, 4, 6 and 12 is of the type having a raised copying window and the feeder mechanisms are arranged to feed the documents to and from the raised window. The copying machine illustrated in FIG. 8 is of the type having a flush-mounted copying window. The difference in the feeders for these different types of machines is in the supporting arrangement of the feeder to compensate for the difference in height of the copying window relative to the upper surface of the copying machine.

Figure 1:
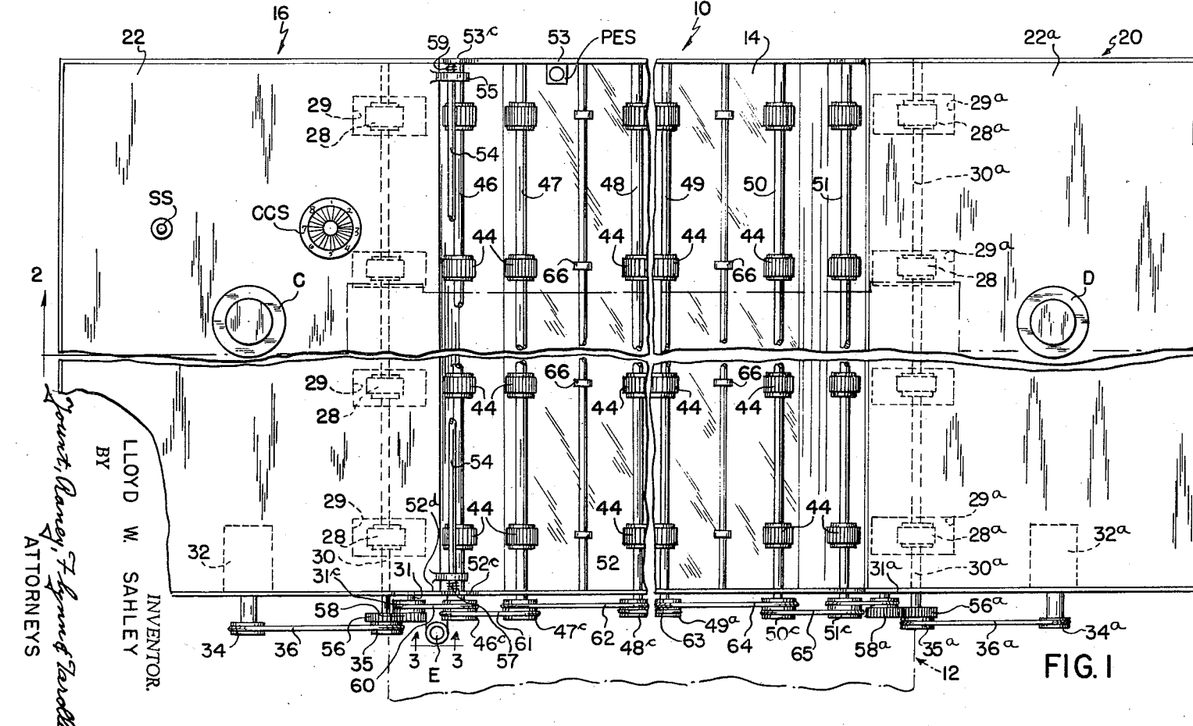
FIG. 1 is a plan view of a feeder embodying the present invention.
Figure 2:
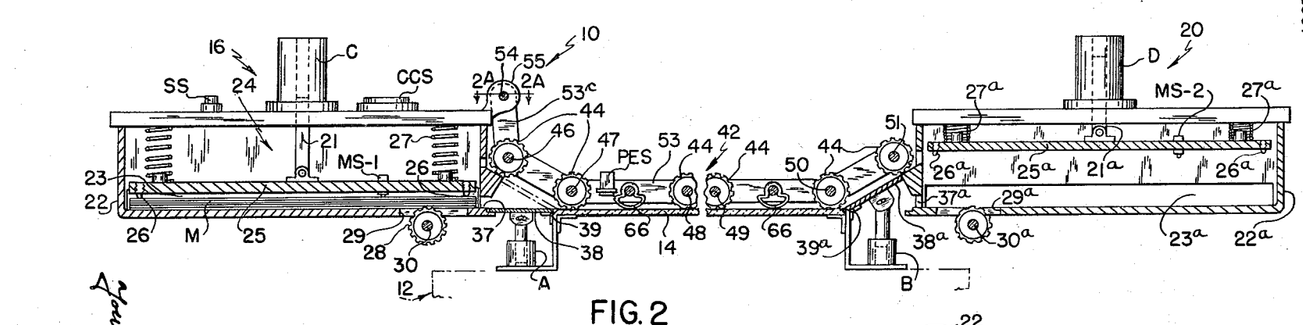
FIG. 2 is a sectional view of the feeder taken approximately along line 2—2 of FIG. 1.

Referring to the drawings and initially to FIGS. 1 and 2, a feeder designated generally as 10 is shown supported on a copying machine 12. The copying machine 12 has a high-rise window or viewing station 14 through which the document to be copied is exposed to the copying mechanism of the copying machine. Upon actuation of the machine 12, an image of a document positioned on the window 14 is made and transmitted. The image is formed on a sheet of copy paper and is subsequently discharged from the machine into some type of receiving tray. The copying machines with which the present invention is associated are commercially available machines and accordingly the details of construction and operation will not be described herein.

The feeder 10 is adapted to feed a document or documents to be copied from a document supply station 16 to the copying or viewing station represented by the copying window 14. The documents represented by the letter M in the drawings are manually loaded into the document supply station 16. When the document M has been positioned on the copying window 14, the copying machine is operated automatically to make an image of the indicia on the document. After the document has been exposed to the copying mechanism of the copying machine, the document is delivered to a second document supply station 20. This operation continues until all the pages of the document M have been presented to the copying window 14 and are stacked at the document supply station 20. If the feeder 10 has been set to provide more than one copy of the document, the document is then fed page-by-page from the document supply station 20 to the copying window 14 where it is again exposed to the copying mechanism of the copying machine 12 and thereafter delivered to the document supply station 14. The operation continues until the document has been exposed the desired number of times to the copying machine 12 to provide the selected number of copies. When the document has been fed the required number of times, the feeder 10 is automatically shut off.

The document supply stations 16 and 20 are provided by identical structure and, consequently, only document supply station 16 will be described in detail. The same reference numerals will be applied to the corresponding parts of the document supply station 20 with the addition of the letter a. The document supply station 14 is provided by a tray 22 which is supported in any suitable manner on the machine 12. The feeder supporting framework will be dictated by the configuration of the machine 12.

The pages of the document M to be copied are prearranged in numerical order with the lowest numbered page on the bottom of the stack if more than one page of the document is to be copied. The stack is manually loaded into tray 22 through a suitable opening 23 in the front side of tray 22 and near the bottom of the tray 22. Tray 22 has associated therewith a hold-down mechanism 24. The hold-down mechanism 24 comprises a plate 25 within tray 22 which has a plurality of spring urged plungers 26 depending therefrom. The plate 25 is spring-urged in a downward direction by a plurality of springs 27 acting between the top side of tray 22 and the upper side of the plate 25. Springs 27 maintain the plungers 26 in contact with document M and which in turn maintain the bottom page of the document in engagement with the bottom of tray 22. The plate 25 moves downward as the sheets are fed from the bottom by a plurality of driven rollers 28. The plate 25 is moved upwardly against springs 27 by a solenoid C. The solenoid C has a rod 21 connected to plate 25. When energized, solenoid C moves the hold-down plate 25 upwardly away from the bottom of tray 22 and the tray is ready to receive documents.

The driven rollers 22 are mounted for rotation by a shaft 30 and are arranged so that their peripheries extend through openings or slots 29 in the bottom of tray 22 and engage the bottom sheet of the document M. Shaft 30 is rotated in clockwise direction, as viewed in FIG. 2, by a motor 32. The motor 32 is preferably an electrical motor which has a drive pulley 34 drivingly connected to a pulley 35 on the end of shaft 30 through a drive belt 36. Operation of motor 32 effects rotation of the rollers 28 which engage the bottom-most sheet and feed it to the right, as viewed in the drawings. The bottom sheet is maintained in engagement with rollers 28 by the hold-down means 24.

The sheet is fed through an opening or feed-slot 37 arranged in the lower portion of the tray 22. As the leading edge of the sheet emerges from the feed slot 36, it moves across a gate 38 and into engagement with the conveyor means 40. Conveyor means 40 feeds the sheet across the copying window 14 until the page is in proper position for exposure to the copying mechanism of the copying machine 12. The conveyor means 40 comprises a power driven roller conveyor 42 having a plurality of power driven rollers 44 mounted on shafts 46, 47, 48, 49, 50 and 51. The shafts 46–51 are supported at their respective ends in conveyor support brackets 52 and 53. The brackets 52 and 53 have upwardly inclined end portions 52c and 53c which are pivotally connected to a shaft 54 by suitable bearings. The shaft 54 is supported on the tray 22 by a plurality of lugs 55 fixed to the top side of tray 22. It should be apparent from the foregoing that the conveyor 42 can be pivoted away from window 14 by manually swinging it counterclockwise, as viewed in FIG. 2, to provide free access to the window 14. With the conveyor 42 swung out of the way, the machine 12 can be manually fed, such as by positioning a book or other document thereon, or in the event a page of the document jams, it can be readily cleared by pivoting the conveyor 42, as described.

An important feature of the present invention is to provide a feeder which is capable of feeding a document comprising sheets of widely varying size and thickness without adjusting the feeder 10. The rollers 28 and 44 are so spaced along their associated support shafts 30 and 46–50 and shafts 30 and 46–50 are so spaced from one another that even when the smallest sized sheet which is in extensive commercial use is fed, at least two of the rollers engage the sheet at any one time. The two-roller engagement provides for feeding the small size sheet with a minimum of misalignment. The sheets of varying sizes must be loaded into tray 22 so that they have a common edge aligned with one corner of tray 22 to initially locate the sheets relative to the rollers.

Figures 2A, 4:
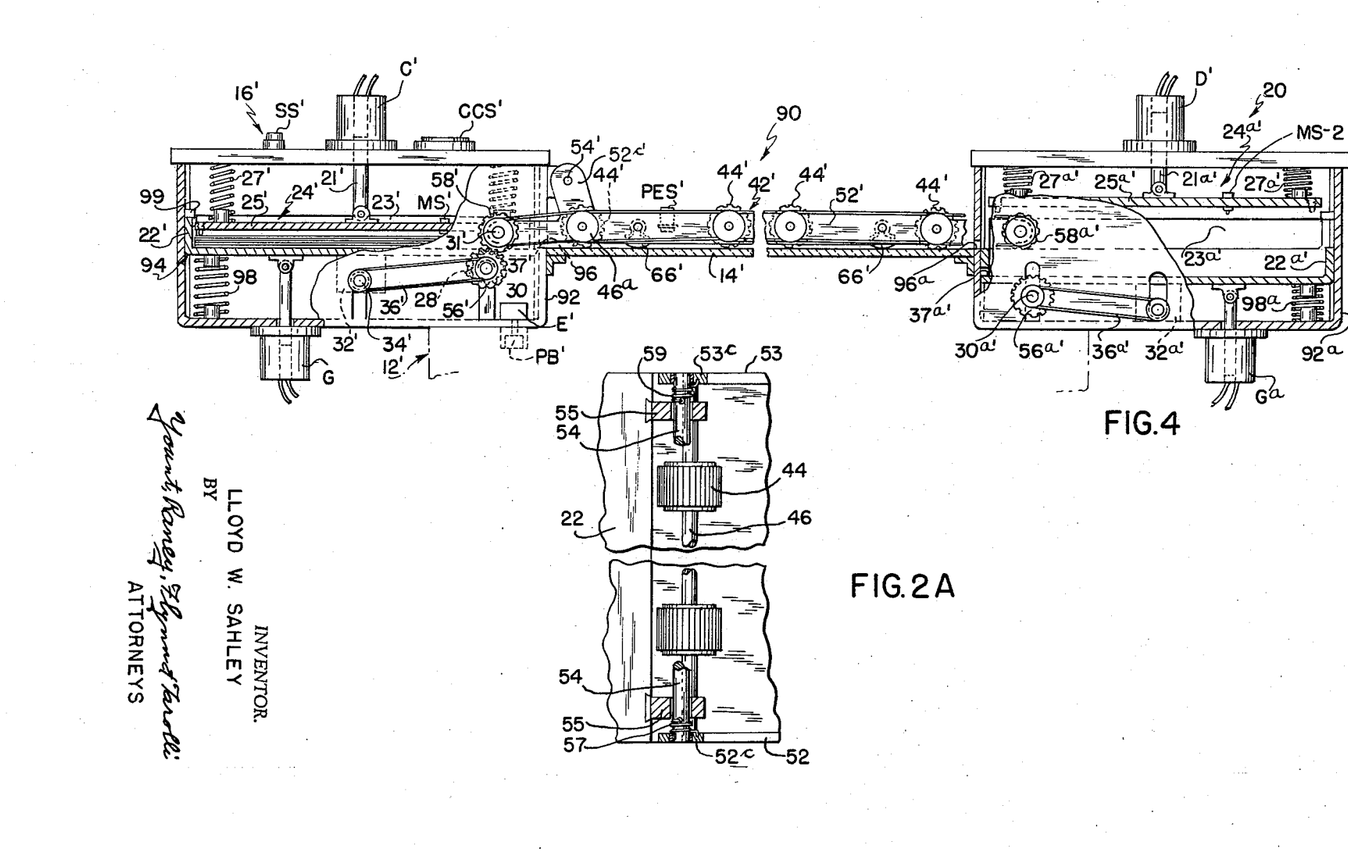
FIG. 2a is a sectional view taken approximately along line 2a—2a of FIG. 2.
FIG. 4 is a view similar to FIG. 2 but showing another feeder embodiment of the present invention.

The feeder 10 automatically compensates for feeding different thickness of sheets by providing means for counterbalancing the frame supporting conveyor 42. In the illustrated embodiment as shown in FIG. 2a the counterbalancing means comprises a pair of coil springs 57 and 59. The springs 57 and 59 are connected at one end to shaft 54 and are connected at their opposite ends to brackets 52 and 53 respectively. Springs 57 and 59 are selected to counterbalance a major portion of the weight of brackets 52 and 53, shafts 46–50 and rollers 44 carried thereby so that roller 44 exerts only a slight predetermined pressure on the copying window 14 which is sufficient to positively drive the sheets. Since the major portion weight of brackets 52 and 53 are counterbalanced by the springs 57 and 59, the rollers 44 are readily moved away from window 14 by the sheet of paper being fed between the rollers and the window. The rollers 44 move upward an extent to accommodate the thickness of the sheet being advanced while advancing the sheet across window 14.

The brackets 52 and 53 are also mounted to permit them to move relative to one another when, for example, the length of the sheet being advanced is less than the width of the conveyor 42. The relative movement is provided by making the openings in lugs 55 larger than the shaft 54 extending therethrough so that the shaft 54 can tilt relative to the lugs and accommodate movement of one of the brackets relative to the other.

The rollers 44 like the rollers 28 have peripheries constructed of friction material such as rubber or the like, to readily move the paper without slipping. The rollers 44 are driven by motor 32. The roller shafts 46–51 are driven from shaft 30 through a disconnectible drive connection. The disconnectible drive connection includes a gear 56 on one end of shaft 30 which meshes with a gear 58 rotatably supported on a shaft 31. Shaft 31 is supported on an arm 52d extending from bracket 52. Also mounted on shaft 31 is a pulley 31c which drives pulleys 46c–51c supported on the ends of shafts 46–51, respectively, through drive belts 60–65 as shown in FIG. 1. When the motor 32 is operated, drive is transmitted from gear 56 to gear 58 and imparts clockwise rotation to rollers 28 and counterclockwise rotation to rollers 44 through pulleys 46c–51c and belts 60–65.

The disconnectible drive connection between gears 56 and 58 permits the described pivoting of the brackets 52 and 53 to provide access to the window 14. When the brackets are pivoted away from the window 14, gear 58 moved out of meshing engagement with gear 56 and upon return of the brackets to their illustrated positions the gears 56 and 58 mesh. When the gears are in mesh, the motor 32 is operated to drive the rollers 28 and 44 a predetermined number of revolutions to move a page of the document from the tray 22 onto the window 14 with the indicia thereon properly located in relationship to the window so that the image will be properly centered on the copy paper. When the rollers 44 rotate the predetermined number of revolutions, the sheet will be positioned with its leading long edge abutting the right hand edge of the frame of the window 14. A plurality of sheet hold-down members 66 are supported by shafts 67 carried by the brackets 52 and 53. The hold-down members 66 are spring members which exert a downward force on the sheet to maintain the sheet in contact with the window 14.

The feeder 10 can be made as a "parasite" unit that can be readily attached to an existing copying machine. If the unit is to be a "parasite" unit, means are provided for initiating the copying cycle of the copying machine after a sheet has been fed and properly positioned on the copying window 14. The copying actuating mechanism preferably is in the form of a solenoid actuated finger 68 arranged to depress the print button PB of the copying machine 12 when a solenoid E is energized. The solenoid E is supported in any suitable manner on tray 22 such as by a bracket 70 extending outwardly from tray 22. The solenoid E is operated when the motor 32 has rotated the rollers 29 and 44 a predetermined number of revolutions indicating that the paper is in proper position on the window 14. Upon energization, the solenoid E moves finger 68 against the bias of a spring to momentarily depress the print button PB of the machine 14, to initiate the copying cycle of the machine. After momentary contact, the solenoid E is de-energized and the spring moves the finger 68 out of engagement with the switch PB.

The copy cycle is initiated by directing a beam of light through the window 14 to illuminate the sheet. An image thereof is made by the copying mechanism and, subsequently, formed on a sheet of copy paper as is well known in the art. After the document on window 14 has been exposed to the copying mechanism, it is conveyed to station 20 by the conveyor 42. With the "parasite" unit, a conventional photoelectric sensing means PES is suitably supported on the bracket 52 above the window 14 in position to sense the light which illuminates the page on window 14. The photoelectric sensing means PES controls operation of motor 32 to move the sheet from window 14 to the document supply station 20 and at the same time, feeds a document or page thereof from the tray 22 of station 16 onto the window 14 and the copying cycle heretofore described is again repeated. The described operation is continued until all the pages of the document to be copied in tray 22 have been fed to the window 14.

The present invention provides for stacking of the sheets in the same numerical order in tray 22a of station 20 as they are loaded into tray 22. Hence, the sheets or pages of the document are always maintained in numerical order so that the copies delivered from the machine will also be in numerical order and will not have to be subsequently collated. The documents after exposure are delivered to the tray 22a by the conveyor 42. The documents are fed up gate 38a which has been moved to its up position and into tray 22a through the upper part of the tray. The pages of the document descend by gravity on to the bottom of the tray.

The gates 38 and 38a are pivoted about hinge axes 39 and 39a and are movable between a down or feed position and an up or receive position by the solenoids A and B. The solenoids A and B are controlled to position the gates 38 and 38A in opposite positions at all times. The solenoids include spring which bias the gates to their down position and when the solenoids are energized they move the gates to their up positions. During feeding from tray 22, solenoid A is de-energized and the gate 38 is in its down position providing for feeding through the feed slot 37 thereacross to the window 14. At the same time the controls have energized the solenoid B to position the gate 38a in the receive or up position as illustrated in FIG. 2 so that the conveyor 42 delivers the document from the window 14 up the ramp or gate 38 and into the top of the tray 22a where it descends by gravity toward the bottom of the tray. Also, the solenoid D of the hold-down mechanism 24a is energized to move the plate 25a to its uppermost position so as not to interfere with the delivery of the sheets to tray 22a.

The aforedescribed feeding operation of the feeder 10 provides for making one copy of each page of the document. The feeder 10 according to the present invention can be set to make a number of copies of the document automatically without manually reloading the tray 22. A copy number selector switch CCS on top of tray 22 can be set to operate feeder 10 so that the selected number of copies of the document are made by the copying machine 12. The switch CSS is a commercially available switch which is stepped once each time that the document is fed to the window 14 from one of the stations and stacked in the other station. The switch CCS is stepped preferably by a metal sensing switch MS-1 or MS-2 carried by the hold-down plates 25 and 25a respectively.

The switches MS-1 and MS-2 are commercially available switches which operate when the plunger thereof engages the metal bottom of the trays 22 and 22a. The switches MS-1 and MS-2 initiate reversal of the feeder to provide for feeding the documents from station 20 to station 16 to provide for making another copy of the document. The switches are inoperative as long as they are out of contact with the bottom of the trays such as when there is a sheet of paper between the plungers and the bottom of the trays or plates 25 and 25a are in their up positions.

If the switch CCS had been set to provide for making one copy of the document, it would be stepped to the zero position after the last page was delivered from the window 14 to the tray 22a of the station 20 and would shut off the feeder. If, on the other hand, switch CCS is set to make more than one copy, for example, two copies, after the last page of the document has been delivered to the station 20, the metal sensing switch MS-1 initiates operation of the controls to reverse the position of gates 38 and 38a and hold-down plates 25 and 25a from their positions shown in FIG. 2. The motor 32a on the tray 22a of the station 20 would then be energized to drive the feed rollers 28a counterclockwise and conveyor rollers 44 clockwise to feed the first page of the document in tray 22a to the window 14. The drive from motor 32a to rollers 28a and 44 is disconnectible and is similar to the drive from motor 32 to rollers 28 and 44 as described heretofore.

When rollers 44 have rotated the predetermined number of revolutions to position the page of the document on window 14, solenoid E is energized to depress print button PB. When the light of the copying machine goes out, photoelectric sensor PES initiates operation of motor 32a to feed the document from window 14 up the gate 38 and into the tray 22 where it will descend by gravity as described heretofore.

As the last page of the document leaves tray 22a, the metal sensing switch MS-2 of the hold-down mechanism 24a contacts the metal bottom of the tray 22a and steps the copy selector switch CSS back to the zero position so that as the last sheet of the document is received in tray 22, the feeder will shut off.

If more than two copies are to be made of the document, the stepping switch CSS would not shut the feeder off after the second feed but would again feed the document from tray 22 to the window 14 and from there to tray 22a. This operation would continue until the selected number of copies are made.

The copies made of the document are delivered from the copying machine 12 into the copy tray of the machine in numerical order and would not have to be collated. As an aid in the separation of each copy of the document, an additional page could be included as the last page of the document and the machine 12 would print this page either as a blank page or as a page bearing indicia indicating that it is a separating page.

Alternatively, controls for the feeder 10 could provide for making an additional copy of a blank page after the last page of the document is fed from the window. Such an arrangement may include in a parasite unit, for example, controls to energize solenoid E for operating the print button PB one more time after the last page is fed from the window 14 and would cause the copying machine 12 to print an additional page which could function as a separator between copies of the document.

Figure 14:
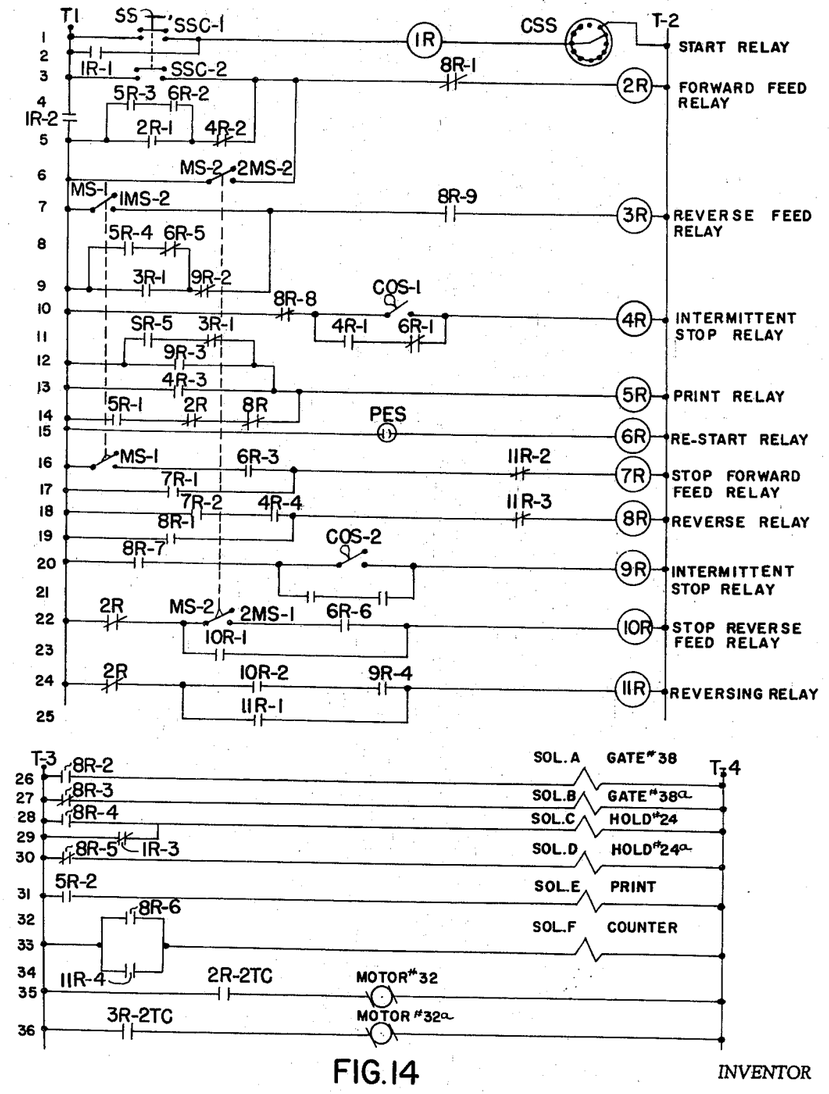
FIG. 14 is a wiring diagram showing controls for the feeder.

The controls for feeder 10 are shown in the circuit diagram of FIG. 14. The control circuit shown therein may be used where the feeder is a so-called parasite unit. Electricity for the circuit is obtained from a wall outlet and suitable means are employed to direct the appropriate current from the outlet to conductor lines T-1, T-2, T-3, and T-4 shown in the circuit diagram.

The pages of the document to be copied are loaded into the tray 22 through opening 23 on the front side of the tray with the indicia down. If more than one page of a document is to be copied, the pages are assembled in numerical order with the first page on the bottom. The operator then turns the copy selector switch CSS to the number of copies desired of the document and depresses the "on" switch of the copying machine 12. For illustration purposes, the switch CSS is shown in the control circuit of FIG. 14 (line 1) in position to make two copies of the document. The operator then depresses the start switch SS which momentarily closes its normally open contacts SSC-1 (line 1) and SSC-2 (line 3). The closing of contacts SSC-1 picks up the start relay 1R. Energization of start relay 12 closes its normally open contacts 1R-1 (line 2) making a holding circuit for relay 1R and contacts 1R-2 in the conductor line T-1, and opens its normally closed contacts 1R-3 (line 29) to de-energize solenoid C (line 28) to permit the hold-down plate 25 to move down and plungers 26 thereon to engage the document.

Before starting, the controls position gate 38 in the down or feed position and the hold-down means 24 in an up position to permit loading of tray 22. The gate 38a associated with the tray 22a is in the up or receiving position as is the hold-down mechanism 24a to provide for receiving the pages of the document as they are delivered from the copy window 14.

Closing of the contacts SSC–2 (line 3) of the starting switch SS picks up the forward feed relay 2R. Energization of forward feed relay 2R closes its normally opened contacts 2R–1 (line 5) making a holding circuit for the relay 2R after the contacts SSC–2 open after the switch SS is released. Energization of relay 2R starts feeding of the document by closing its normally open time delayed closing contacts 2R–2TC (line 35) completing a circuit to the forward drive motor 32 for the feed rolls 28 and 44. Energization of the motor 32 drives feed rollers 28 and feeds the bottom page from the tray 22 through the feed slot 37 into engagement with the registering rollers 44 which move the page across the copying window 14. After the motor 32 rotates the feed rollers a given number of revolutions to properly position the page in abutment with the right edge of the frame for copying window 14 as viewed in FIG. 2, a cam operated switch COS–1 (line 10) closes its contacts momentarily and picks up an intermittent stop relay 4R. The cam operated switch COS–1 can be mounted, for example, on a stepped-down shaft driven by the motor 32 so that as the motor rotates the predetermined number of revolutions the cam rotates one revolution and closes the contacts of the switch COS–1.

Energization of the intermittent stop relay 4R closes its normally open contacts 4R–1 (line 11) making a holding circuit around the cam switch COS–1 and stops the motor 32 by opening its normally closed contacts 4R–2 (line 5) in the holding circuit for the forward feed relay 2R. When the forward feed relay 2R drops out its contacts 2R–2TC (line 35) open and stops the forward drive motor 32.

Energization of the intermediate stop relay 4R also closes its normally open contacts 4R–3 (line 13) completing a circuit to pick up the print relay 5R. Energization of print relay 5R closes its normally open contacts 5R–1 (line 14) to form a holding circuit for the print relay 5R and starts operation of the copying machine 12 by closing its normally open contacts 5R–2 (line 31) completing a circuit to energize solenoid E. Energization of solenoid E causes the plunger 68 thereof to move out and depress the print button PB of the copying machine 12.

Depressing of the print button PB starts the copy mechanism into operation which includes turning on a light which illuminates the document through the window 14. As the illuminating light goes on the photoelectric sensor PES (line 15) senses the light and closes contacts which picks up the restart relay 6R. Energization of the restart relay 6R opens its normally closed contacts 6R–1 (line 11) which drops out the intermittent stop relay 4R. Dropping out relay 4R closes its normally closed contacts 4R–2 (line 5) but energization of the forward relay 2R is prevented at this time due to opening of normally closed contacts 6R–2 (line 4). When the light goes off, the switch of sensor PES opens and drops out the relay 6R closing its normally closed contacts 6R–2 (line 4) establishing a circuit to again energize forward feed relay 2R through the now closed contacts 5R–3 of print relay 5R and through the normally closed contacts 4R–2 of the intermediate stop relay 4R. Energization of the forward relay 2R energizes the forward feed motor 32 by closing contacts 2R–2TC (line 35). The rollers 44 move the page on the copying window 14 into the tray 22a and at the same time feed the next page of the document from tray 22 to the copy window 14. After the forward feed motor 32 has rotated the required number of revolutions to position the next page onto the copying window 14, the intermittent stop relay 4R is picked up by momentary closing of the cam operated switch COS–1 as described heretofore and drops out the forward feed relay 2R to stop the forward feed motor 32.

This operation continues until the last page of the document leaves tray 22. As the last page leaves the tray 22, the metal sensing switch MS–1 closes its contacts MS–1 (line 16) and MS–2 (line 7). When the illuminating light of the copying machine is sensed by the photoelectric sensor PES, the restart relay 6R is energized and closes its normally open contacts 6R–3 (line 16) completing a circuit to energize the stop forward feed relay 7R. Energization of the stop forward feed relay 7R closes its normally open contacts 7R–1 (line 17) forming a holding circuit for the stop forward feed relay 7R and closes its normally open contacts 7R–2 (line 18). When the illuminating light of the copying machine goes out after the last page has been exposed, the forward feed relay 2R is picked up as described heretofore and the last page is fed from the window 14 to the receiving tray 22a. After the feed rollers 44 have rotated a given number of revolutions by the motor 32, the cam switch COS–1 closes and picks up the relay 4R. Energization of the relay 4R stops motor 32 by opening contacts 4R–2 (line 6) and closes its normally open contacts 4R–4 (line 18) and at this time completes a circuit to the reversing relay 8R.

Energization of relay 8R sets up the feeder to feed the pages from tray 22a to window 14, so that a second copy of the document can be made. Energization of relay 8R closes its normally open contacts 8R–1 (line 19) and forms a holding circuit for the reverse relay 8R. Energization of reverse relay 8R closes its normally open contacts 8R–1 (line 19) and forms a holding circuit for the reverse relay 8R. Energization of reverse relay 8R closes its normally open contacts 8R–2 (line 26) and energizes solenoid A which moves gate 38 up to be in position to direct the documents delivered from the copy window 14 into the tray 22. At the same time, energization of relay 8R opens its normally closed contacts 8R–3 (line 27) and de-energizes solenoid B and gate 38a moves to the down or feed position. Energization of the relay 8R reverses the positions of the hold-downs 24 and 24a by closing its normally open time delayed closing contacts 8R–4TC (line 28) which energizes solenoid C after a time delay and moves the hold-down mechanism 24 up and opens its normally closed contacts 8R–5 (line 30) for de-energizing solenoid D moving the hold-down mechanism 24a down under the influence of the springs 27a into engagement with the document in the tray 22a. Energization of relay 8R steps the copy selector switch CSS by closing its normally open contacts 8R–6 (line 32) which completes a circuit to solenoid F which indexes the copy selector switch CCS one step counterclockwise indicating that one complete copy of the document has been made. Energization of reverse relay 8R also closes its normally open contacts 8R–7 (line 20) for setting up the intermittent stop relay 9R for controlling the reverse feed motor 32a and opens its normally closed contacts 8R–8 (line 10) which drops the forward intermittent stop relay 4R for the forward directions out of the reverse feed circuit set up.

It should be apparent that the aforedescribed operation of reverse relay 8R reverses the feeder and sets it up so that it is ready to feed the documents from the tray 22a to the copy window 14 and from there to the tray 22. The reverse feeding operation starts by closing contacts 8R–9 (line 7) which picks up reverse feed relay 3R before contacts 1MS–2 (line 7) of metal sensing switch MS–1 open. Contacts 1MS–2 open when solenoid C is energized and shifts hold-down 24 to its upper position. Relay 3R is held in by closing its contacts 3R–1 (line 9) when contacts 1MS–2 open. However, to insure that the hold-downs 24 and 24a and gates 38 and 38a have been reversed prior to reverse feeding, the contacts 3R–2TC (line 36) of reverse feed relay 3R delay in closing to delay energization of reverse motor 32a.

After a slight delay, contacts 3R–2TC (line 36) close and energize reverse feed motor 32a. The reverse feed motor 32a rotates the rollers 28 counterclockwise and rollers 44 clockwise and feeds the first page from the tray 22a onto the window 14. When the motor 32a has rotated a required number of revolutions the cam operated switch COS–2 (line 20) momentarily closes and picks up the intermittent stop relay 9R. Energization of the intermittent stop relay 9R closes its normally open contacts 9R–1 (line 21) and forms a holding circuit for the relay 9R about the switch COS–2. Energization of the intermittent stop relay 9R stops the reverse motor 32a by opening its normally closed contacts 9R–2 (line 9) breaking the circuit to the reverse feed relay 3R. Energization of relay 9R also closes its normally open contacts 9R–3 (line 12) completing a circuit to pick up the print relay 5R. Energization of print relay 5R closes its contacts 5R–5 (line 11) making a holding circuit for the print relay 5R and closes its contacts 5R–2 (line 31) and energizes solenoid E which depresses the print button PB of the copy machine 12.

Depression of the print button PB initiates operation of the copy mechanism of the copy machine and the illuminating light goes on to illuminate the document on the window 14. When the light goes on the photoelectric sensor PES closes completing a circuit to the restart relay 6R. Energization of the restart relay 6R opens its contacts 6R–4 (line 21) dropping out the intermediate stop relay 9R and returns its normally open contacts 9R–2 (line 9) to their closed position. Energization of the relay 6R also opens its contacts 6R–5 (line 8) preventing energization of the reverse feed relay 3R at this time. After the illumination cycle is completed, the light goes out and the relay 6R drops out returning contacts 6R–5 (line 8) to the closed position completing a circuit for energizing reverse feed relay 3R through the now closed contacts 5R–4 (line 8) of the print relay 5R, through the normally closed contacts 6R–5 of the restart relay 6R, through the normally closed contacts 9R–2 of the now de-energized intermediate stop relay 9R to the reverse feed relay 3R.

Energization or reverse relay 3R closes its time delayed closing contacts 3R–2TC (line 36) and energizes the drive motor 32a. This described operation is repeated until all the pages in the tray 22a have been fed from the tray 22a to the window 14. As the last page leaves the tray 22a the metal sensing switch MS–2 closes its contacts 2MS–1 (line 22) in preparation for initiating the final stop of the reverse feed operation. As the last page is being illuminated by the copy mechanism of the copy machine, the relay 6R is picked up and closes its normally open contacts 6R–6 (line 22) completing a circuit to the relay 10R. Energization of the relay 10R closes its normally open contacts 10R–1 (line 23) making a holding circuit for the relay 10R. Energization of relay 10R also closes its normally open contacts 10R–2 (line 24) in preparation for energization of the reversing relay 11R. As the last page is fed from the copy window 14 into the tray 22 the cam operated switch COS–2 momentarily closes and picks up relay 9R as described heretofore. Picking up of relay 9R closes its contacts 9R–4 (line 24) completing a circuit to the reversing relay 11R. Energization of relay 9R also stops the reverse feed motor 32a by opening its normally closed contacts 9R–2 (line 9) dropping out the reverse feed relay 3R which in turn de-energizes the reverse motor 32a.

Energization of the reversing relay 11R reverses the feeder set up to prepare for feeding the document in the forward feed direction. Energization of relay 11R closes its normally open contacts 11R–1 (line 25) making a holding circuit for the relay 11R. Energization of relay 11R opens its normally closed contacts 11R–2 (line 16) and contacts 11R–3 (line 18) dropping out the relays 7R and 8R.

Dropping out of the relay 8R picks up forward speed relay 2R through the now closed contacts 2MS–2 (line 6) of metal sensing switch MS–2 and through normally closed contacts 8R–1 (line 3). Feeding does not start immediately since contacts 2R–2TC (line 35) delay in closing to permit the gates 38 and 38a and hold-downs 24 and 24a to be reversed. De-energization of relay 8R opens its normally open contacts 8R–9 (line 7) to prevent energization of reverse feed relay 3R during the forward feed cycle. The feeder set up is reversed by dropping out of relay 8R which opens contacts 8R–2 (line 26) and closes contacts 8R–3 (line 27) to position gate 38 in the down position and gate 38a in the up position. Hold-down 24 for tray 22 is moved down upon opening of contact 8R–4TC (line 28) and hold-down 24a for tray 22a moves up upon closing of contacts 8R–5 (line 30). Moving up of hold-down 24a opens contacts 2MS–2 (line 6) of metal sensing switch MS–2 and forward feed relay 2R is held in by contacts 2R–1 (line 5).

It should be apparent from the foregoing that the feeder 10 is ready to feed the document in the forward feed direction and this will occur when the time delay closing contact 2R–2TC (line 35) close. However, the copy selector switch CCS was set to feed the document twice to the copying machine and energization of reversing relay 11R steps the counter CCS one position by closing its normally open contacts 11R–4 (line 34) completing a circuit to the solenoid F. The contact arm of switch CCS is now in the 12 o'clock position breaking the circuit therethrough which drops out the starting relay 1R and opens its normally open contacts 1R–2 (line T–1) stopping further operation of the feeder. Dropping out of start relay 1R closes its normally closed contacts 1R–3 (line 29) which energizes solenoid C to move hold-down 24 up so that the document copied can be readily removed from tray 22 and the tray can be reloaded with a new document.

The feeder 10 was described heretofore as a parasite-type feeder. The feeder 10 could, however, be controlled by the copying machine 12 and in which event, the controls for operating the feeder would be integrated into the controls for the copying machine. Integrated controls would eliminate at least solenoid E which depresses the print button PB on the copying machine each time a document has been positioned on the window 14 and in addition, the photoelectric sensor PES would likewise be eliminated. The functions controlled thereby would be provided by the control circuits of the copying machine.

Figure 3:
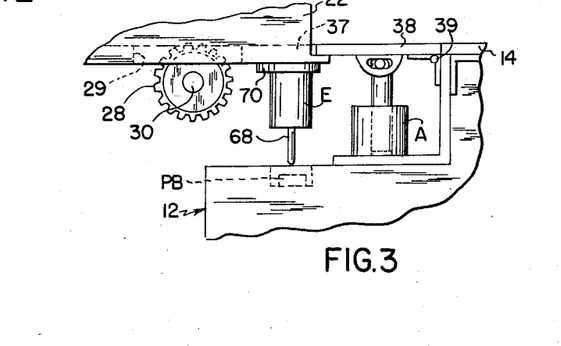
FIG. 3 is an elevational view of part of the feeder indicated by line 3—3 of FIG. 1.

Another embodiment of an automatic document feeder for a copying machine is illustrated in FIG. 4 and is designated generally as 90. The feeder 90 operates generally in the same manner as the feeder 10 disclosed in FIGS. 1–3. Parts corresponding to parts of the feeder 10 will be designated with corresponding reference numerals with a prime mark added thereto to designate the parts of feeder 90.

The feeder 90 has document supply stations 16' and 20' between which the documents M' are fed in the course of positioning the pages of the document on the window 14'. The sheets are fed from the stations 16' and 20' by a conveyor 42' driven by motors 32' and 32a' depending upon whether the feed is from station 16 to the window 14' or from station 20 to the window. The structures of stations 16' and 20', like stations 16 and 20, are identical and, consequently, only station 16' will be described in detail, and the corresponding structure of station 20' will carry the same reference numeral with the addition of a small letter "a."

Station 16' is provided by a housing 92 suitably secured to the copying machine 12' by suitable brackets or the like (not shown) which provides for a rigid connection to the housing of the copying machine. A document receiving tray 22' is disposed within housing 92. Tray 22' is mounted for vertical movement relative to the housing 92 and has a tongue-and-groove connection 94 with the housing to guide the tray 22' as it moves vertically. The tray 22' has a feed slot 37' located adjacent the lower portion thereof through which the sheets are fed. Cooperating with feed slot 37' is a feed slot 96 in the housing 92 intermediate the top and bottom. When the feed slot 37 is aligned with slot 96 a sheet or page of a document supported on the tray 22' can be fed through the slots to the conveyor 42'.

The tray 22' is movable between a feed position which is the position thereof illustrated in FIG. 4 to a receive position which is the position of tray 22a' at station 20'. The trays 22' and 22a' are moved into their feed positions by springs 98 acting between the underside of the tray 22' and the bottom of the housing 92. A suitable stop 99 is provided to limit the uppermost position of the tray 22' and wherein the feed slots 37' and 96 are in alignment. The tray 22' is moved downward to its receive position by a solenoid G. Solenoid G is operatively connected to the underside of the tray 22.

The feeder 90 operates similar to the feeder 10. The operator sets the number of copies on the copy selector switch CSS', and the feeder 90 is set up as shown in FIG. 4. The document to be copied is loaded lengthwise into the tray 22' through a slot in the front of housing 92. At start-up, the tray 22' is in its up position and the front end of the tray 22' is open and is in alignment with the loading opening in housing 92. The hold-down 24' is in its up position to permit loading of the tray 22'. The motor 32' is then energized to drive the roller 28' and rollers 44' to feed the sheet through the feed slots 37' and 96, to the window 14' of the copying machine 12'. The motor 32' and shaft 30' which supports rollers 28' and gear 56' are supported on the bottom of tray 22' and move with the tray. Hence, before motor 32' can drive rollers 44, the tray 22' must be in feed position so that gear 56' and 58' are meshed.

When the page is properly positioned on the window 14', the print button PB' is depressed by solenoid E' and an image is taken of the indicia on the document. If the unit is a parasite type unit, photoelectric sensing means PES' senses the light and again energizes the motor 32' to feed the document into the tray 22a' which is in its receive position. This operation continues until all the pages of the document have been copied and are deposited in the tray 22a'. If more than one copy is to be made, the position of the trays 22' and 22a' are reversed from their positions shown in FIG. 4 by operation of solenoids G and Ga. The trays 22a' is in its feed position and the tray 22' in its receive position and the motor 32a' is energized to drive the conveyor 42' to feed the sheets from the tray to the window 14'. From the window 14, the sheets are delivered to the tray 22' in the same numerical order in which they are delivered to the window 14. This operation continues until the stepping switch CCS' has been stepped back or forward depending upon the type of switch mechanism employed until the required number of images have been taken of the document by the copying mechanism of the copying machine 12'.

The controls for feeder 10 shown in FIG. 14 can be employed for controlling feeder 90. Solenoids G and Ga would replace solenoids A and B in the circuit and otherwise the circuit would operate to control feeder 90 in the same manner as described for feeder 10.

The feeders 10 and 90 can be operated in a manner to eliminate the document supply stations 20 and 20'. In such an arrangement, the pages of the document would be fed from tray 22 and 22' to the windows 14 and 14' and thereafter, the motor 32 and 32' would be reversed to drive the rollers 44 and 44' clockwise so that the pages would be fed from the copying windows 14 and 14' back to the tray 22 or 22'. In feeder 10, this would require changing the position of the gate 38 after each exposure so that the sheet returned from the window 14 to the tray 22 would be fed into the top of tray 22 and thereafter, the gate would be lowered in preparation for feeding the bottom sheet of the document to the window 14, and so on and so forth.

Feeder 90 would require the postion of trays 22' be moved from the feed to the receive position after the document is exposed to the copying mechanism so that the sheet would be fed back on top of the pages remaining to be copied. The metal sensing switch MS-1 and MS-1' would be mounted so that the end thereof protrudes slightly above the bottom surface of the respective trays and a metallic separator sheet can be loaded into the trays as the top sheet of the document so that when the sheets have all been fed, the metallic separator would engage the switch MS-1 or MS-1' causing the selector switch CSS or CSS' to be stepped one position, indicating that one copy of the document has been made. The separator sheet would, in turn, be fed to the window 14 or 14' and the copy thereof would separate the copies of the document made by the machine.

Any suitable control means could be provided for reversing the positions of the gate 38 or trays 22' for providing the desired operation. Although this mode of operation of the feeder 10 and 90 will be more time consuming, it has the advantage of always returning the document to single station 16 in addition to providing a lower cost unit due to elimination of stations 20 and 20'.

Although feeders 10 and 90 have been disclosed in connection with the high-rise type copying window, they are also equally adaptable for feeding documents to a flush-mounted copy window. To adapt feeders 10 and 90 for feeding to copying machines having flush-type windows, the trays 22 and 22a' and housing 92 and 92a may be mounted at an angle relative to the window 14 and corresponding adjustments made in the conveyor 42 and 42'. This additional arrangement has not been illustrated as it is deemed to be within the skill of the art. Moreover, the feeders can be integrated into the initial design of the copying machines and the problem of providing suitable means for supporting the feeders on an existing machine would be eliminated.

The present invention also provides document feeders for copying machines of the type described heretofore and which feeders operate to feed the document to the copying station of the machine and to thereafter deliver the document from the window to a second station. If an additional copy of the document is desired, the pages of the document will have to be manually removed from the second station and reloaded into the first station. Several embodiments of feeders which provide for making a single copy of a document are disclosed herein and shown in FIGS. 5 through 13.

Figures 5, 6, 7:
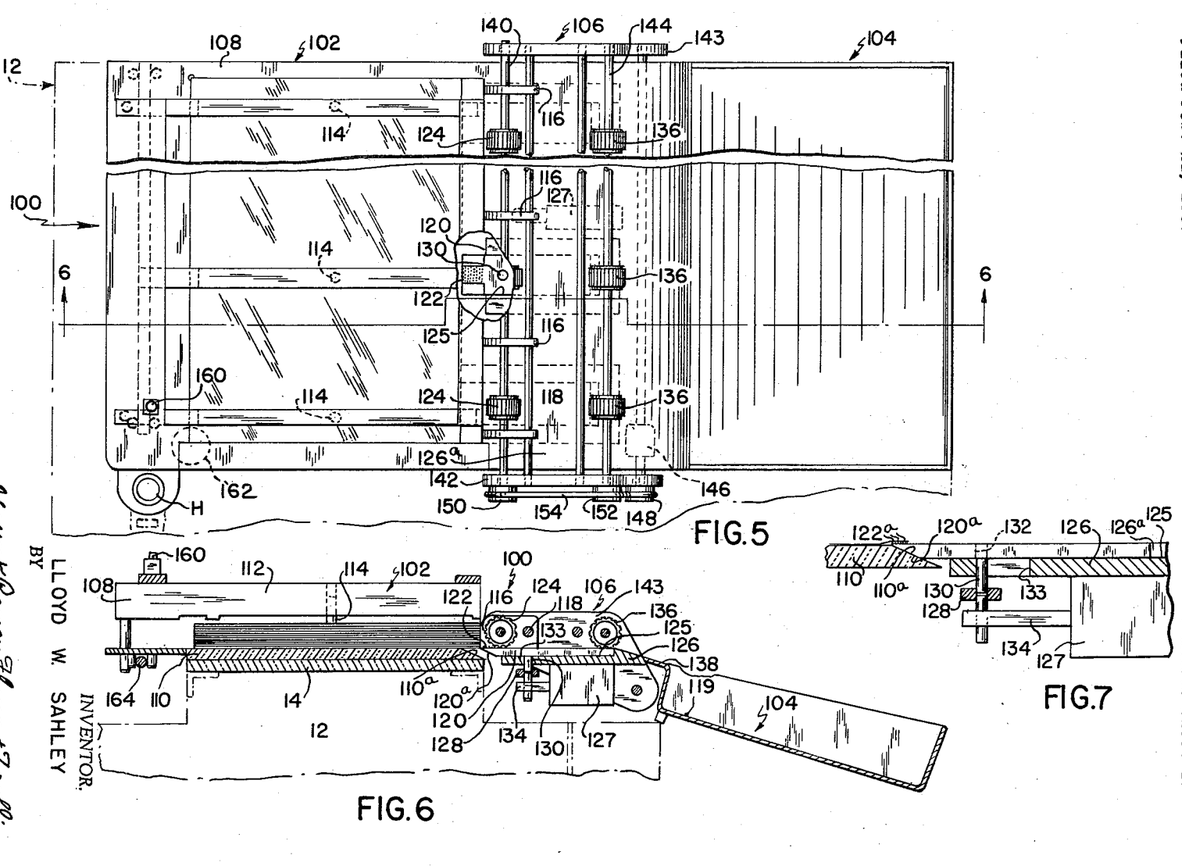
FIG. 5 is a plan view of still another feeder embodiment of the present invention.
FIG. 6 is a sectional view taken approximately along line 6—6 of FIG. 5.
FIG. 7 is a fragmentary sectional view of the feeder of FIG. 6 and showing parts in different positions.

One of the manual reloading-type feeder embodiments is shown in FIGS. 5 through 7 and is indicated generally by reference numeral 100. Feeder 100 comprises a document supply station 102 overlying the copying window 14 of the copying machine 12 and a document receiving station 104. A document feeding mechanism 106 operates to advance the pages of the document to the copying station and feed the pages successively to the document receiving station 104 after each page has been exposed to the copying mechanism of the copying machine 12.

The document supply station 102 is provided by a frame 108 which is shown attached to the copying machine 12 above the copying window 14. Frame 108 has a transparent bottom plate 110 which rests on the window 14. The frame 108 has a cover 112 which overlies the transparent plate 110. The cover 112 is movable vertically toward and away from the transparent bottom plate 110 and has a plurality of spring biased hold-down members 114 which engage the top sheet of the document to maintain the bottom sheet in engagement with the transparent bottom 110.

The document is loaded into the frame 108 between the cover 112 and plate 110 at the front side of the feeder. The cover 112 can be moved upwardly to load the pages of the document into frame or tray 108 and is then moved downwardly until the spring mounted hold-down members 114 engage the top sheet of the stack. The right edges of the sheets as viewed in FIG. 6 abut against a guide member supported on rod 118 of the feed mechanism 106. The abutment 116 vertically align the sheets and properly position them in relation to copying window 14.

The bottom page is in position to be exposed to the copying mechanism of the copying machine 12 through window 14. After exposure, the bottom sheet is fed one at a time from the transparent bottom 110 by the feeding mechanism 106 and are deposited in a tray 119 of the document receiving station 104. A new bottom sheet is then positioned on transparent plate 110 and is ready to be exposed to the copying mechanism of the copying machine 12. The feeding operation continues until all pages of the document have been deposited in tray 119 and the feeder is shut off.

The feeding mechanism 106 comprises a plurality of reciprocating members 120 having sheet gripping means 122 at their forward end. The gripper members 120 move to the left as viewed in the drawings and are forced upwardly so that the gripping means 122 thereof engages the bottom of the sheet and upon withdrawal, pulls the sheet from the stack into a feed roll 124. The reciprocating members 120 are slidably mounted in recesses 125 provided in the bottom plate 126 of the framework of the feed mechanism 106 and are moved into and out of the tray 108 by a solenoid 127. The members are drivingly interconnected to move simultaneously by a crossbar 128. The crossbar 128 has a plurality of vertically extending pins 130 which are slidably received in openings 132 provided in the feed members 120. Slots 133 are provided in plate 126 to accommodate movement of pin 130. The movable ram 134 of the solenoid 127 is connected to the crossbar 128 by a pin connection 135. By this arrangement, movement of the ram of the solenoid to the left moves the leading ends of feed members 120 into the tray 108. The front or leading portion of each member 120 has an inclined surface 120a which engages an inclined surface 110a formed on the opposite edge of the transparent bottom 110. The wedging engagement between the surfaces 120a and 110a forces the feed members 120 upwardly. Upward movement of member 120 provides good frictional engagement between the gripping means 122 and the underside of the leading edge of the bottom sheet of the document. Furthermore the upward movement breaks the contact between the bottom sheet and transparent plate 110 as shown in FIG. 7 so that the sheet can be readily removed therefrom.

Preferably, the upper leading surfaces of the feed members 120 are coated with friction material and have a plurality of very fine needles 122a extending vertically from the upper surface. As the members 120 move upwardly, the fine needles 122a pierce the bottom sheet. The needles 122a have very small diameters which are preferably approximately .002–.003 inches at the tips and preferably extend upward approximately .004 of an inch from member 120. The members 120 can be set so that the needles 122a do not go all the way through the paper and in any event make very small unnoticeable perforations in the paper and are sufficient to grip the sheet. Reverse movement of the ram 134 of the solenoid 127 pulls the bottom sheet away from the stack and introduces the leading portion thereof into feed rolls 124.

The feed rolls 124 engage the upper side of the leading edge of the sheet and strip it from the feed members and move it along the upper flat surface 126a into registry with a plurality of second feed rolls 136. The feed rolls 136 continue to feed the sheet to the right as viewed in the drawings onto an apron 138. The sheet is conveyed along the apron 138 and is deposited in the tray 119 of the document receiving station 104.

The feed rolls 124 have a friction surface so as to provide good frictional engagement with the sheet to move same along the flat surface 126a of plate 126 and along apron 138. The feed rolls 124 are mounted on a shaft 140 which is supported at its opposite end in brackets 142 and 143. The feed rolls 136 also have a friction surface and are mounted on a drive shaft 144 which is likewise journaled in the brackets 142 and 143. The drive shafts 140 and 144 are driven by a motor 146 which drives a pulley 148. Pulley 148 drives pulleys 150 and 152 mounted respectively on the ends of shafts 140 and 144 through a flexible drive belt 154. The drive arrangement provides for rotating of rolls 124 and 136 counterclockwise as viewed in FIG. 6.

The document to be copied is placed in the tray 108 at the document supply station 102 and the cover 112 is moved into position so that the hold-downs 114 urge the bottom sheet against the transparent plate 110. Controls, not shown, are provided to operate feeder 100 as a parasite unit and which may be generally similar to the controls disclosed for the automatic feeders 10 and 90. Feeder 100 has an on button 160 which is depressed by the operator along with the on button of the copying machine 12. Depressing on button 160 energizes a solenoid H which operates like solenoid E of feeder 10 to depress the print button of the copy machine 12. A photoelectric sensor 162 similar to sensor PES of feeder 10 initiates operation of solenoid 127 of feed mechanism 106 after the light illuminating the bottom sheet goes out.

Energization of solenoid 127 moves gripping members 120 into gripping engagement with the bottom page of the document which has just been exposed to the copying mechanism. A suitable switch is activated by movement of the members 120 to their extreme left position shown in FIG. 7 and de-energizes solenoid 127 and initiates operation of motor 146 to drive rolls 124 and 136. Upon de-energization of the solenoid 127, the members 120 are retracted preferably by spring means associated with solenoid 127. Retraction of members 120 removes the bottom page from document supply station 102 and feeds it into the first series of feed rolls 124. The feed rolls 124 strip the sheet from gripper means 122 and move the sheet along the surface 126a into registry with the second series of feed rolls 136. The feed rolls 136 move the document along the apron 138 into the tray 119. The operation continues until all the pages of the document have been copied. If additional copies are to be made of the document, the pages of the document accumulated in tray 119 are reloaded into the document supply station 102 and the described operation is repeated.

The structure of the document supply station 102 including frame 109 and cover 112 can also be pivoted as a unit about a guide rod 164 of machine 12 on which the frame 108 is mounted so that the machine can be used for copying documents, such as books or the like, by manual operation of the machine 12.

Another feeder embodiment according to the present invention is disclosed in FIGS. 8–11 and is designated generally as 170. Feeder 170 is generally similar to the feeder 100. The feeder 170 is shown as a feeder for a copying machine 12" having a flush-mounted copying window 14". The feeder 170 includes a document supply station 172 disposed above the window 14" of the machine 12 and feeding mechanism 174 for successively feeding the bottom sheets of the document after they have been copied by the copying mechanism into a document receiving station 176.

The document supply station 172 includes a frame 178 which is suitable secured to the machine 12" by suitable connector means. A transparent glass plate 180 is secured to the frame 178 and overlies the glass copying window of the machine. The document to be copied is placed face down on the transparent plate 180 and a vertically movable hinged cover 182 is lowered on top of the stack of documents and a plurality of spring urged hold-downs 184 engage the top sheet and maintain the bottom sheet in contact with the transparent window 180. The cover member 182 is supported on the framework by a rod 186 which is free to move in a vertical slot 188 provided in the frame 178. By this arrangement the cover member 182 can move up and down to accommodate loading of different sized documents and moves downward as the stack is depleted by the feed mechanism 174. The cover 182 has a handle 190 to provide for pivoting the cover 182 about the rod 106 to load the feeder.

After the document has been loaded and the cover 182 placed on top of the document, an operators depresses the on button 192 of the copying machine 12" and the on button 194 of the feeder 170. The feeder 170 operates generally similar to feeder 100 and the controls described for feeder 100 may be employed to control operation of feeder 170. Depression of on button 194 operates a solenoid I which depresses the print button of the machine 12". As the document illuminating light goes out a photoelectric sensor, not shown, initiates operation of the feeding mechanism 174 to feed the bottom sheet to station 176.

The feeding mechanism 174 comprises a plurality of reciprocable feed members 196 which move under the cover 182 and into engagement with the bottom page of the document and remove the document from the transparent plate 180. The transparent plate 180 has a beveled edge 180a wihch cooperates with a beveled edge 196a provided on the leading portion of each of the feed members 196 to wedge the feed members 196 up into engagement with the underside of the document positioned on the transparent plate as described heretofore in connection with feed members 120 of feeder 100. The leading surface of the feed members 196 are preferably rubber coated and may include a plurality of tiny needles 198, as described heretofore to pierce the document. The piercing of the document by the needles 198 and the wedging action assist in breaking the contact betwen the bottom sheet and the transparent plate 180 to permit air to move thereunder and help to break surface tension therebetween so that the page can be subsequently readily removed upon reverse movement of the feed members 196.

The feed members 196 are guidably supported in slots 200 provided in the feeding mechanism framework. The feeding members 196 are moved into engagement with the document by spring means 202. Spring means 202 act between the right end of slots 200 and the right end of feeder members 196 as viewed in the drawings. The members 196 are retracted from their FIGS. 9 and 10 position to their position illustrated in FIG. 8 by a plurality of pinions 204 mounted on a common shaft 206 which in turn is driven by an electric motor 208. The upper side of each of the members 196 have a rack 210 formed thereon which meshes with one of the pinions 204. The members 196 are guided on suitable bearings, such as ball bearings 212. During non-feeding, the feed members 196 are maintained in their retracted position by a solenoid operated detent 214 (FIG. 9) which engages a recess 216 on one of the members 196. The detent 214 is spring urged into recess 216 when they are aligned and is retracted to release the associated member 196 by a solenoid J. It is only necessary to latch one of the feed members 196 since it locks the pinion shaft 206 which in turn holds the other members 196 in their retracted positions through their associated pinion 204. Upon energization of solenoid J by the photoelectric sensor, the detent 214 will be withdrawn from recess 216 and members 196 are moved by springs 202 into engagement with the document. A suitable connection such as a one way clutch may be provided between pinion shaft 206 and motor 208 to permit the shaft to rotate clockwise as viewed in FIG. 8 as the members move toward the document.

Figure 9:
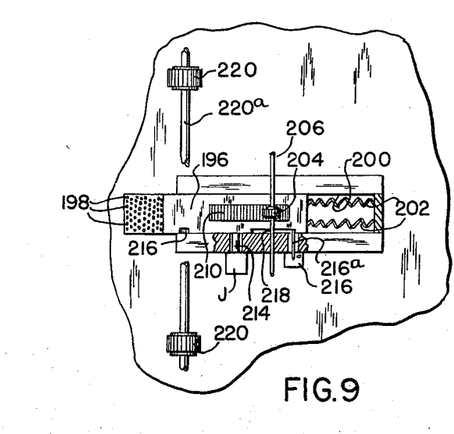
FIG. 9 is a fragmentary plan view with parts removed of the feeder of FIG. 8.

The motor 208 is operated by a conventional switch 216 (FIG. 9) which is tripped when the members 196 have moved to their extreme left position. Switch actuator 216a is received in a slot 218 in one of the members 196 and is tripped after predetermined movement of the member 196 to the left as shown in FIG. 9. Motor 208 rotates pinion shaft 206 counterclockwise and pinions 210 drive the members 196 and gripped sheet to the right.

As the leading edge of the sheet is moved to the right it is engaged by the feed rolls 220 which have a friction surface, such as rubber, and strip the sheet from the feed members 196 and move it along an inclined ramp 222. A second set of feed rolls 224 are provided adjacent the upper end of the feed ramp 222 and engage the leading edge of the sheet and continue to move the page into a tray 226 of the document receiving station 176.

Figures 10, 11:
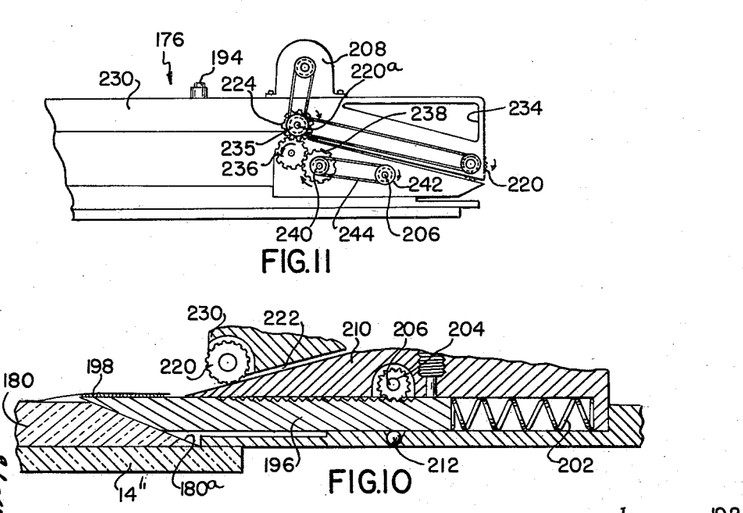
FIG. 10 is a fragmentary sectional view of the feeder of FIG. 8 and showing parts in different positions.
FIG. 11 is a fragmentary elevation view of the feeder of FIG. 8 as viewed from the back side.

The rolls 220 and 224 are driven from the electric motor 208 through a series of belts and pulleys as shown in FIG. 11. The motor 208 is stopped by switch 216. Switch 216 is again tripped when the members 196 are in their retracted position and stops motor 208 after a suitable delay to insure that rolls 220 and 224 have moved the sheet into tray 226.

The rolls 220 and 224 and the drive means therefor are mounted on a cover member 230. The cover member 230 is pivoted to the framework providing the tray 226 by pin 232. The left-hand end of the cover member 230 has an opening 234 providing a hand hold so that the cover 230 can be pivoted about the hinge pin 232 to remove the documents in the tray 226.

The drive from motor 208 to pinion shaft 206 is disconnectible to permit pivoting of cover 230. The disconnectible drive includes a gear 235 on shaft 220a carrying rolls 220 which meshes with a gear 236 on a stub shaft on the stationary frame of the feeder mechanism 174. Gear 236 meshes with a gear 238 mounted on a stub shaft which carries a pulley 240. Pulley 240 drives a pulley 242 fixed on the end of pinion shaft 206 through a belt 244.

The described operation of the feeder 170 assumes that the feeder is to be a parasite-type unit. However, if the feeder 170 is to be an integral part of the copying machine 12", the feeder can be controlled by the circuits of the copying machine and the photoelectric sensor and the solenoid I for actuating the print button can be eliminated.

Figure 12:
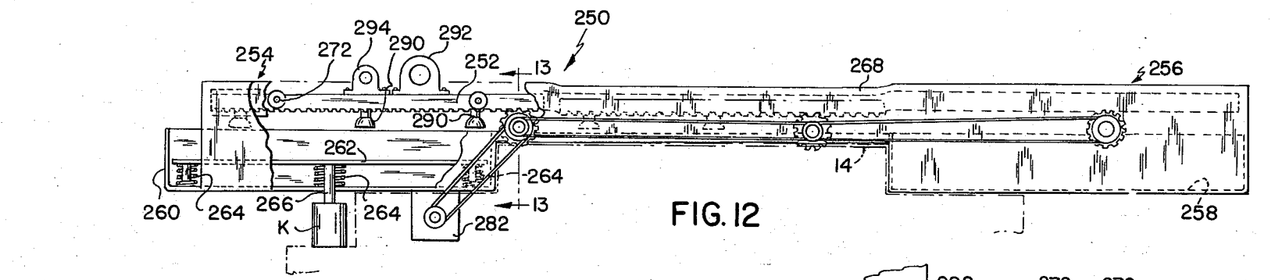
FIG. 12 is an elevational view with parts broken away of a further feeder embodiment of the present invention.
Figure 13:
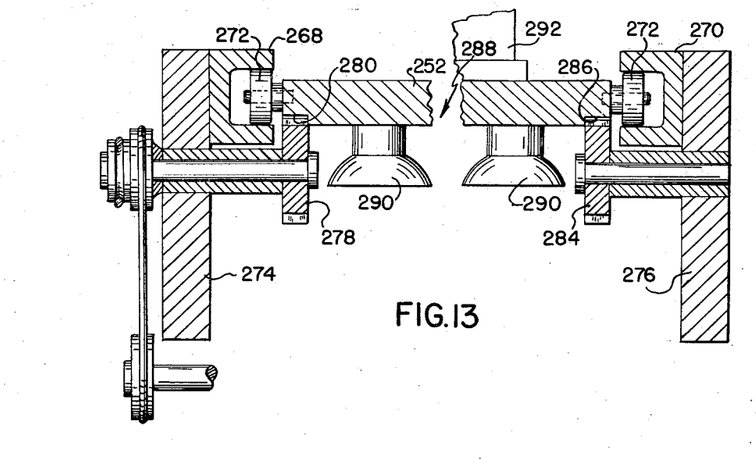
FIG. 13 is a sectional view taken approximately along line 13—13 of FIG. 12.

A still further feeder embodiment of the present invention is disclosed in FIGS. 12 and 13 and is designated generally 250. Feeder 250 comprises a transfer carriage 252. The transfer carriage 252 is movable from a first position above a document supply station 254 and wherein the carriage 252 grips the top sheet of a document to a second position above copying window 14 of copying machine 12. The carriage 252 positions the document on the window 14 without releasing same and the copying machine 12 is actuated to make a copy thereof through the copying window 14. After the document on the carrier 252 has been exposed to the copying mechanism, it is moved to a third position which is adjacent a document receiving station 256. Stripping means are provided for stripping the page from the carrier so that it falls by gravity into a tray 258 of the document receiving station 256. The carriage 252 is then returned to the document supply station 254 where it grips another document and carries same to the window 14 and to the document receiving station 256.

The document supply station 254 includes a housing providing a tray 260. The tray 260 has a vertically movable bottom 262. The bottom 262 is urged upwardly in the tray 260 by a plurality of springs 264 to maintain the top sheet of the documents in position to be engaged by the gripping means of the carrier 252. A solenoid K is operatively connected to the tray 260 and has a plunger 266 connected to tray bottom 262 to move the bottom 262 downward for loading of the tray 260.

The carriage 252 is supported for movement between the three positions by a pair of spaced tracks 268 and 270. The tracks 268 and 270 extend from the document supply station 254 to the document receiving station 256. Each track is generally C-shaped and is adapted to receive therein rollers 272 supported on the carriage 252. The tracks 268 and 270 are supported by brackets 274 and 276 on the copying machine 12. Bracket 274 supports drive means such as driven pinions 278 which mesh with a gear rack 280 provided along the underside of the carriage 252 to drive the carriage. The pinions 278 are driven from an electric motor 282 through a drive belt and pulley arrangement, as shown in FIGS. 12 and 13. A plurality of idler pinions 284 are supported on bracket 276 and mesh with a rack 286 on the underside of carriage 252 and prevent the carriage from skewing. Depending from the underside of the carriage is a plurality of gripping means 288 which preferably are three rows of suction members 290. Suitable interconnected air conduits are provided on the carriage 252 to interconnect each suction member 290 to a rotary air pump 292 mounted on the carriage 252. The air pump 292 is driven by a suitable electric motor 294 on the carriage 252.

At start-up, the documents are loaded into the tray 260 with the indicia face down and the stack is urged upwardly by the springs 264. The carriage is in its first position above the tray 260 and the top sheet of the stack of the documents is moved into or adjacent to the bottom edge of the suction members 290. A switch is actuated which operates motor 294 to drive the rotary air pump 292 and establish a vacuum or suction in the suction members 290 which will grip the top sheet of the document. After a suitable delay, the motor 282 is actuated to rotate the pinions 278 which mesh with the rack 280 and drive the carriage from its first position to a position in which the document overlies the copying window of the copying machine. It should be noted that the tracks 268 and 270 curve slightly downward adjacent the copying station to position the document in contact with the copying window 14. At the copying station the suction members 290 function as hold-down means to maintain the sheet to be copied flat and in contact with the copying window 14. When the carriage is in its second position as described, a switch is actuated to stop motor 282 and start the copying cycle of the copying machine. After the image has been transmitted to the copying mechanism of the copying machine, the drive motor 282 is again actuated to move the carriage to its third position over the tray 258 of the document receiving station 256. When the carriage is properly positioned over the tray 258, a limit switch is tripped which shuts off the motor 294 driving the rotary air pump which in turn shuts off the suction and the sheet drops into the tray 258. The carriage 252 is then returned to its first position where it is ready to carry out another cycle. The operation continues until all the sheets to be copied have been fed into the receiving tray 258 at which time the feeder 250 is shut off. If additional copies of the document are to be made, an operator must remove the document from the tray 258 and reload it into the tray 260 at the document supply station 254.

It should be noted that the tracks 268 and 270 are preferably pivoted adjacent trays 258 and 260 to provide for pivoting the tracks 268 and 270 away from the window 14 to expose the copying window of the machine for other types of copying.

Although the several feeder embodiments of the present invention have been described in considerable detail herein, it is intended to cover all adaptations modifications, and changes coming within the scope of the appended claims. For example, adhesive material could be substituted for the paper-gripping needles on the feeding members of feeders 100 and 170. Also adhesive material could be utilized to secure the sheets to the carriage of feeder 250 and a solenoid operated stripper could be provided at the document receiving station to engage and strip the sheets from the carriage. Furthermore, the feeding arrangements of the manual reloading feeders 100, 170 and 250 may be incorporated into the automatic feeders 10 and 90. The above noted changes are merely representative of some of the more apparent changes contemplated by the present invention and should not be construed as inclusive of all the changes which come within the scope of the appended claims.

What is claimed is:

1. A feeder for feeding the pages of a document individually to a viewing station of a copying machine or any photoelectric device which views an original document comprising means defining a document supply station from which the individual pages are advanced to said viewing station, and feeding means for advancing the pages of the document to said viewing station and for returning the pages of the document to said supply station for repeated viewing thereof by the machine.

2. A document feeder as defined in claim 1 further including control means for controlling the operation of said feeding means and settable to effect a selected number of repeated operation of said feeding means for providing said selected number of viewings of said document.

3. A document feeder as defined in claim 2 wherein said feeding means includes an electrical drive motor and said control means includes circuit means for operating said electric drive motor, said circuit including an electrical switch means settable to provide a set number of operations of said circuit means whereby the machine can make a selected number of viewings of the document.

4. A document feeder as defined in claim 1 wherein said feeding means includes a document station for receiving a document from said viewing station and from which the document is returned to said document supply station.

5. A document feeder as defined in claim 2 wherein said feeding means includes a second document station, means for delivering the document from said viewing station to said document station and for feeding the document from said second document station to said viewing station and said control means controls the number of times the document is fed to said viewing station from said document stations.

6. A document feeder as defined in claim 5 wherein each of said document stations comprises a document tray having a feed opening in the lower portion thereof through which the document is fed and gate means movable to an operative position for directing the document into the tray at the upper portion of the tray and said control means includes means for positioning said gate means for the tray receiving the document from the viewing station in said operative position.

7. A document feeder as defined in claim 5 wherein each of said document stations comprises a vertically movable document tray and means for moving said trays between a feed position wherein a document can be fed therefrom to said viewing station and a receiving position wherein a document can be received from said viewing station and said control means controls the position of said trays so that when one of the trays is in said feed position, the other of said trays is in said receive position.

8. A document feeder as defined in claim 1 wherein said viewing station includes an external viewing window in the machine and through which the document is exposed to the viewing mechanism of the machine.

9. A document feeder for a machine which views the document pages at a viewing station comprising means providing a document supply station for the document, means providing a stationary viewing window spaced a predetermined distance from said supply station, means for presenting the pages in said supply station to said viewing window including means for positioning each page in proper orientation on said window for viewing by the viewing mechanism of the machine, wherein at least a portion of the feeder overlies said window, and means supporting said portion for movement away from said window to expose said window.

10. A document feeder for a machine which views the document pages at a viewing station comprising means providing a document supply station for the document, means providing a stationary viewing window spaced a predetermined distance from said supply station, means for presenting the pages in said supply station to said viewing window including means for positioning each page in proper orientation on said window for viewing by the viewing mechanism of the machine, wherein said document supply station is located above said window and said means for presenting a document to the window includes a hold-down means exerting a downward force on the document to urge it into viewing position.

11. A document feeder as defined in claim 10 wherein said means for presenting a document to the window further including means including a reciprocable member to grip a page of the document and remove same from the window to present the succeeding page of the document to the window.

12. A document feeder for advancing the pages of a document to be copied to a viewing station of a copying machine or for any photoelectric device having a viewing station at which an original document is viewed comprising means providing a document storage station into which the pages of the document are loaded in the form of a stack and means for successively advancing the pages of the document at said document storage station to the viewing station and from the viewing station to a document receiving station including a reciprocable feed member having sheet gripping means and operable to engage a page of the document upon movement in one direction and remove the engaged page from the stack upon movement in the opposite direction and means associated with the document storage station and engageable with said feed member as said feed member moves in said one direction to drive said gripping means into engagement with a page.

13. A document feeder as defined in claim 12 wherein said gripping means includes a plurality of small needles projecting from the leading portion of said feed member and adapted to pierce the bottom sheet of the document upon movement of said feed member into engagement with the bottom sheet.

14. A document feeder as defined in claim 12 wherein said gripping means includes adhesive material on the leading portion of said feed member and adapted to adhere to the bottom sheet of the document upon movement of said feed member into engagement with the bottom sheet.

15. A document feeder as defined in claim 12 wherein said document supply station includes a lower bottom plate upon which the bottom sheet of the document rests and said means associated with said document storage station includes a beveled surface on said bottom plate which engages the leading portion of the feed member to force it into engagement with the bottom sheet.

16. A document feeder as defined in claim 15 wherein the leading portion of said feed member is beveled and is engageable with said beveled surface of said bottom plate to provide a wedging action on said feed member.

17. A document feeder as defined in claim 16 wherein said means for successively advancing the pages of the document further include a plurality of said feed members, each of said feed members having a beveled surface which engages said beveled surface of said bottom plate to force said feed members into engagement with the bottom sheet of the document and drive means for moving said feed members simultaneously.

18. A document feeder as defined in claim 17 wherein said drive means includes a solenoid and means for drivingly connecting said solenoid to said feed member.

19. A document feeder as defined in claim 17 wherein said drive means comprises a plurality of springs biasing said feed members in said one direction toward said bottom plate, a plurality of pinions supported for rotation by a driven shaft and each of said feed members having a rack in meshing engagement with an associated one of said pinions whereby rotation of said pinions drives said feed members in said opposite direction.

20. A document feeder as defined in claim 19 wherein said drive means further includes means for locking said feed members in a position in which said beveled surfaces are out of engagement and releasable to permit said feed members to move in said one direction under the influence of said springs.

21. A document feeder as defined in claim 12 wherein said viewing station comprises an exterior transparent window through which the documents are exposed to the viewing mechanism of the machine and wherein said document supply station has a bottom transparent plate which overlies said window whereby the bottom sheet of the document is exposed to the viewing mechanism through said transparent plate and said window.

22. A document feeder for successively feeding pages of a document to a viewing station of a copying machine or for any photoelectric device having a viewing station at which an original document is viewed comprising means providing a document supply station into which the documents to be viewed are loaded, and a document receiving station adapted to receive the documents after they have been viewed, a carriage means supporting said carriage for movement from a first position adjacent said document supply station to a second station at said viewing station and from said second station to a third station adjacent said document receiving station, sheet gripping means on said carriage and adapted to grip a document at said first station and to release said document at said third station.

23. A document feeder as defined in claim 22 wherein said sheet gripping means comprises a plurality of suction members depending from said carriage and means for selectively establishing a suction in said suction members to secure the sheet to the carriage and means for discontinuing the suction in said suction members at said third station to release the sheet.

24. A document feeder as defined in claim 22 wherein said means supporting said carriage for movement includes guideways extending from said document supply station to said document receiving station and having an intermediate portion adjacent said second carriage station which is offset vertically from the other portions thereof to provide for positioning a sheet carried by the carriage at said viewing station.

25. A document feeder for a copying machine or for any photoelectric device which views an original document through an exterior viewing window comprising means defining a document supply station for receiving a document to be viewed, means supporting said document supply station adjacent said viewing window, means for presenting the pages of a document to the viewing window including means for positioning each document page relative to the viewing window for exposure to the viewing mechanism of the machine through the window, said means for presenting the document to the window comprises power driven roller means engageable with the document at said document supply station and operable to convey the document to the window, said power driven roller means includes a plurality of spaced rollers, means counter-balancing said rollers to exert a predetermined pressure on the window and operable to provide for movement of said rollers away from the window an extent necessary to accommodate the thickness of a sheet being advanced across said window by said rollers.

26. A document feeder for a copying machine or for any photoelectric device which views an original document through an exterior viewing window comprising means defining a document supply station for receiving a document to be viewed, means supporting said document supply station adjacent said viewing window, means for presenting the page of a document to the viewing including means for positioning each document page relative to the viewing window for exposure to the viewing mechanism of the machine through the window, said document supply station is located above said window and said means for presenting a document to the window includes a hold-down means exerting a downward force on the document to urge it into viewing position, said means for presenting a document to the window further including means includng a reciprocable member having a document gripping means and means for reciprocating said member to grip a page of the document and remove same from the window to present the succeeding page of the document to the window, said gripping means comprises a plurality of fine needles protruding vertically from said member and adapted to penetrate a single page of the document and feed it upon movement of said reciprocable member.

27. A document feeder for a copying machine or for any photoelectric device which views an original document through an exterior viewing window comprising means defining a document supply station for receiving a document to be viewed, means supporting said document supply station adjacent said viewing window, means for presenting the pages of a document to the viewing window including means for positioning each document page relative to the viewing window for exposure to the viewing mechanism of the machine through the window, said document supply station is located above said window and said means for presenting a document to the window includes a hold-down means exerting a downward force on the document to urge it into viewing position, said means for presenting a document to the window further including means including a reciprocable member having a document gripping means and means for reciprocating said member to grip a page of the document and remove same from the window to present the succeeding page of the document to the window, said gripping means comprises adhesive material on said reciprocating member and engageable with document to secure the document to said member.

28. A document feeder for a copying machine or for any photoelectric device which views an original document through an exterior viewing window comprising means defining a document supply station for receiving a document to be viewed, means supporting said document supply station adjacent said viewing window, means for presenting the pages of a document to the viewing window including means for positioning each document page relative to tne viewing window for exposure to the viewing mechanism of the machine through the window, said means for feeding the document to a window includes a carriage supported for movement between a first position adjacent said document supply station and a second position above the window, document gripping means on said carriage and adapted to engage a document when said carriage is at first position and to position the gripped document on the window when the carriage is at said second position, said carriage is further supported for movement to a third position adjacent a document receiving station and said carriage is adapted to deliver a document from the window to said document receiving station and to release the document at said third position.

29. A document feeder as defined in claim 28 wherein said document gripping means comprises a plurality of suction members.

30. A document feeder as defined in claim 28 wherein said document gripping means comprises parts having adhesive material thereon and further including stripping means adjacent said third station to strip the document from said adhesive areas when said carriage is at said third position.

31. A document feeder as defined in claim 29 further including a suction pump and means for communicating said suction pump with said suction members to establish a suction in the suction members to secure a document to a carriage.

32. In a method of making a plurality of copies of a document having document sheets stacked in a given order at a supply station and including exposing individual document sheets at an exposure station of a copying apparatus, the improvement comprising sequentially exposing said individual document sheets in said given order a plurality of times automatically whereby the copies obtained from said document sheets are repetitively produced in said given order.

33. The invention defined in claim 32, wherein said improvement includes, sequentially moving the stacked document sheets in said given order from said supply station to said exposure station; and sequentially feeding exposed document sheets from said exposure station back to said supply station in a manner maintaining said given order of said document.

34. The invention defined in claim 32, wherein said improvement includes, sequentially feeding the stacked document sheets in said given order from said supply station to said exposure station; sequentially feeding said exposed document sheets to a receiving station in a manner maintaining said given order of said document; and thereafter sequentially feeding said document sheets in said receiving station back to said exposure station in said given order.

35. The invention defined in claim 34, wherein said improvement includes sequentially feeding document sheets that have been fed to said exposure station from said receiving station, back to said supply station in a manner maintaining said given order so that the cyclic copying of documents fed from the supply station to the receiving station and back to the supply station can be repeated.

36. An improved method of handling a multi-page document having pages arranged in a predetermined order to facilitate production of multiple collated copies of the document, said method comprising sequentially moving pages of said document in the predetermined order from a supply station into copying relation with an exposure station of a copying apparatus; and sequentially moving pages exposed at the exposure station back to the supply station in a manner maintaining the predetermined order.

37. A method of feeding a multipage document to facilitate production of multiple collated copies of the document, said method comprising sequentially moving individually pages of said document in a predetermined order into a copying relation with the exposure station of a copying apparatus; sequentially moving pages exposed at said exposure station to a receiving station in a manner maintaining said predetermined order; and, after the last page of said multipage document has been received at said receiving station, sequentially moving said documents in said predetermined order from said receiving station back to said exposure station.

38. The invention defined in claim 37, further including the step of sequentially moving said pages, which have moved from said receiving station to said exposure station, back to their original location in said predetermined order, so that the defined feeding cycle can be repeated.

39. In a document feeding mechanism having means defining a copying position, means defining a document supply station for supporting a stack of document pages in a given order, and means for moving documents supported at said supply station seriatum in said given order to said copying position, the improvement comprising means for feeding document pages from said copying position back to said supply station in a manner maintaining said given order.

40. A document feeder as defined in claim 39 including control means for controlling feeding and delivering of sheets including means for operating the machine to make a separator page between each replica of the document to separate each replica of the document made by the machine.

41. A document feeder as defined in claim 40 wherein said means for operating the machine to provide a separator includes means for feeding a separator sheet as the last page of the document.

42. A device for handling a document having document pages arranged in a predetermined order in a manner facilitating the production of multiple collated document copies, said device being adapted for use with copying apparatus of the type having a copying station whereat document pages are located for copying and comprising means defining a supply station for receiving and supporting in the predetermined order a stack of document pages to be copied; means for sequentially moving in the predetermined order to the copy station, document pages supported at said supply station; and means for sequentially feeding document pages from the copy station to said supply station in a manner maintaining the predetermined order.

43. A document handling device adapted for use with copying apparatus of the type having a copying station at which sheets of a document are located for copying, said device comprising first means for supporting a stack of document sheets; second means for supporting a stack of document sheets; and means for feeding a stack of document sheets seriatum back and forth between said first and second supporting means and across the copy station in a manner maintaining the order of feed of the document sheets in said stack, whereby copies produced from said document will be collated in the order supplied to said first support means.

References Cited

UNITED STATES PATENTS

| | | | |
|---|---|---|---|
| 2,947,218 | 8/1960 | Hayden et al. | 355—64 X |
| 2,968,992 | 1/1961 | Billet | 355—64 X |
| 3,179,001 | 4/1965 | Silverman | 355—41 |
| 3,256,791 | 6/1966 | Blume et al. | 355—6 |
| 3,266,366 | 8/1966 | Hunt | 88—24 |

NORTON ANSHER, Primary Examiner

RICHARD A. WINTERCORN, Assistant Examiner

U.S. Cl. X.R.

271—9, 54, 61; 355—6, 48, 50